United States Patent Office 3,454,661
Patented July 8, 1969

3,454,661
PROCESS FOR PREPARING ALLYL CHLORIDE AND ITS MONOMETHYL-SUBSTITUTION PRODUCTS
Löthar Hörnig, Frankfurt am Main, Lothar Hirsch, Kelkheim, Taunus, and Günther Mau, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 7, 1965, Ser. No. 462,084
Claims priority, application Germany, June 16, 1964, F 43,185; Dec. 7, 1964, F 44,626
Int. Cl. C07c *17/34, 21/04*
U.S. Cl. 260—654
9 Claims

ABSTRACT OF THE DISCLOSURE

Process for preparing allyl chloride or its monoethyl substituted derivatives from $C_3$ or $C_4$ olefins, hydrogen chloride, and oxygen, or from oxygen and $C_3$ or $C_4$ monochloroparaffins, in the presence of a catalyst of tellurium and/or tellurium compounds.

---

The present invention relates to a process for preparing allyl chloride and its monomethyl-substitution products.

It is known to react olefins directly with chlorine to yield compounds in which one or more carbon atoms directly adjacent to the carbon atoms of a double bond each carry a chlorine atom. Propylene, for example, reacts with chlorine at high temperature and with a short residence time to form 3-chloropropene-(1) (allyl chloride). When butene-(2) is used the chlorination reaction takes place at lower temperature and leads to the formation of 1-chloro-butene-(2) (crotyl chloride). Isobutene can be transformed at low temperatures and under the action of chorine into 3-chloro-2-methyl-propene-(1) (methallyl chloride).

In the aforesaid chlorination processes, some of which are carried out on an industrial scale, such as the high temperature chlorination of propylene, one mol of chlorine ($Cl_2$) is used for one mol of olefin. Only one half of the chlorine is used up for the formation of the allyl chloride, while the other half forms hydrogen chloride as by-product. As in many chlorination processes in this case, too, the economy of the process is impaired by the formation of hydrogen chloride.

A process for transforming an olefin into the corresponding allyl chloride, avoiding the formation of hydrogen chloride and utilizing readily available hydrogen chloride and oxygen as chlorinating agents would considerably advance the art.

It has now been found that allyl chloride and monomethyl-substituted allyl chloride can advantageously be prepared by passing oxygen and (a) mixtures of olefins with 3 or 4 carbon atoms and hydrogen chloride or (b) monochloro-paraffins with 3 or 4 carbon atoms or (c) mixtures of (a) and (b) over a catalyst containing elementary tellurium and/or tellurium compounds.

Using olefins having one methyl group in α-position, the reaction of the olefin with oxygen and hydrogen chloride leads practically exclusively to the formation of the corresponding allyl chloride. Propylene and butene-(1) yield practically exclusively allyl chloride and 3-chloro-butene-(1), respectively. When olefins are used having two α-methyl groups, dichloro-olefins are obtained in addition to the corresponding methyl-substituted allyl chlorides. From butene-(2) and isobutene, 1-chlorobutene-(2) (crotyl chloride) and 3-chloro-2-methyl-propene-(1) (methallyl chloride), respectively, are obtained as principal products and 1.4-dichlorobutene-(2) and 1.3-dichloro-2-methylene-propane, respectively, as by-products. The reaction is especially smooth with propylene and isobutylene. Therefore, these olefins are prefered as starting products.

When a monochloroparaffin is reacted with oxygen, allyl chloride (3-chloro-propylene-(1)) is obtained from 2-chloropropane (isopropyl chloride) and 1-chloropropane (n-propyl chloride). Using 2-chloro-2-methyl-propane (tert. butyl chloride) and 1-chloro-2-methylpropane (isobutyl chloride) the reaction furnishes methallyl chloride (3-chloro-2-methyl-propylene-(1)). With the use of 2-chlorobutane (sec. butyl chloride) and 1-chlorobutane (n-butyl chloride), a small amount of crotyl chloride (1-chlorobutene-(2)) and 3-chlorobutene-(1) is obtained. In all cases the stoichiometric amounts of water are formed.

The secondary and tertiary monochloroparaffins (isopropyl chloride, tert. butyl chloride, sec. butyl chloride) are more readily oxidized, i.e. under milder conditions, to give the corresponding allyl chlorides (allyl chloride, methallyl chloride, crotyl chloride) than the primary monochloroparaffins (n-propyl chloride, isobutyl chloride, n-butyl chloride). It is remarkable that isopropyl chloride reacts more readily than sec. butyl chloride, although both compounds contain the chlorine atom in secondary position, and that isopropyl chloride and tert. butyl chloride have about the same reactivity, although in the former compound the chlorine atom is a secondary one while in the latter compound it is a tertiary one. Hence, it follows that isopropyl chloride and tert. butyl chloride especially react smoothly to yield allyl chloride and methallyl chloride, respectively. Therefore, the two former compounds are preferred as starting products and the two latter compounds as reaction products.

As catalyst elementary tellurium or one or several tellurium compounds are used. The tellurium compounds can contain the tellurium in any valence stage. It is advantageous to use compounds that are readily obtainable in industry, above all compounds of tetravalent tellurium, such as tellurium dioxide, tellurium tetrachloride and tellurium oxychloride. It is likewise possible to use compounds of bivalent tellurium such as tellurous oxide and tellurous chloride, as well as tellurites and tellurates. Mixtures of the aforesaid compounds with one another or with elementary tellurium may also be used.

The catalyst containing elementary and/or bound tellurium is suitably supported on an inert carrier material, for example aluminum oxide, aluminum silicate, silica gel, pumice, asbestos, feldspar, sandstone, clay, zeolithe or silicium carbide. The system consisting of catalyst and carrier material is advantageously prepared by mixing a tellurium-containing solution, for example a solution of tellurium tetrachloride in hydrochloric acid, with one of the specified carrier materials and evaporating the mixture to dryness. A catalyst thus obtained which contains the tellurium substantially in bound form, can be directly used in the reaction. It is likewise possible, however, to reduce the tellurium compound to the metal by treating the catalyst with a reducing agent such as hydrogen or sulfur dioxide.

It is not decisive for the activity of the catalyst whether elementary tellurium or a tellurium compound is used. Whether elementary tellurium or a tellurium compound is used, in most cases, after some time of reaction the catalyst contains a mixture of elementary tellurium and bound tellurium. The presence of selenium does not show a detrimental effect. It is advantageous to use a catalyst system containing 0.5 to 20% by weight of tellurium. It is also possible, however, to carry out the process according to the invention with a catalyst containing a smaller or higher proportion of tellurium. Alternatively, the catalyst can be used without carrier material, for example in the form of tellurium metal powder or tellurium dioxide. Catalyst solutions may be used, too, for example a solution of tellurium chloride in aqueous hydrochloric acid through which the gaseous starting components are conducted.

In general, the reaction according to the invention is carried out in a manner such that the starting components, hydrogen chloride, oxygen and olefin, or oxygen and monochloroparaffin, advantageously in admixture with one another, are passed over the solid or dissolved catalyst. When the olefin or the monochloroparaffin is not gaseous but liquid under the reaction conditions or is dissolved in a solvent, the mixture of oxygen and hydrogen chloride, on the one hand, and the liquid olefin, on the other, or the oxygen, on the one hand, and the liquid monochloroparaffin, on the other, are passed in countercurrent flow or in parallel flow over a fixed catalyst bed, this being a mixed phase reaction. Alternatively, the reaction can be carried out in a suspension of the catalyst in a liquid. In this case, too, the catalyst may contain a carrier material. The liquid used to suspend the catalyst can be the olefin or the monochloroparaffin itself or a solution thereof in a solvent inert to the reaction.

The starting components can likewise be used in admixture with gases inert to the reaction, for example low molecular weight saturated hydrocarbons such as ethane, propane, butanes, furthermore nitrogen, the noble gases, carbon dioxide, or hydrogen. The oxygen required for the reaction may be used in the form of air, and the hydrochloric acid may be used in the form of vapors of aqueous hydrochloric acid. If aqueous hydrochloric acid is used as a starting component, it may be contacted with the catalyst as a liquid.

Liquid starting components can be used in admixture with solvents inert to the reaction, such as ketones, for example acetone and cyclohexanone, cyclic ethers such as dioxane, chlorinated hydrocarbons, for example chloroform, saturated hydrocarbons, for example hexane, and benzene.

More particularly, the reaction is carried out in a manner such that a gas mixture containing the reaction components is passed through a tube filled with the catalyst, the gas mixture is condensed at the end of the reaction tube, the unreacted or formed monochloroparaffin is separated from the condensate and reconducted wholly or partially into the reaction tube together with the uncondensed portion of the reaction gas. In the preferred case of the preparation of allyl chloride from propylene or isopropyl chloride or of methallyl chloride from isobutylene or tert. butyl chloride, it is advantageous to cool the gas mixture at the end of the reaction zone to a temperature above the boiling point of the monochloroparaffin but below the boiling point of allyl chloride or methallyl chloride, respectively. Performing this partial condensation saves the costs otherwise incurred in the condensation and vaporization of the unreacted or newly formed monochloroparaffin to be reconducted into the reaction zone.

It is advantageous but not necessary to select such a temperature and pressure that the monochloroparaffin is present in the gaseous state.

The reaction products are processed in the usual manner. After leaving the reaction zone, the reaction mixture is cooled, whereby the allyl chloride or its methylsubstitution product and the unreacted or newly formed monochloroparaffin are condensed. The condensate is preferably separated by distillation. In some cases, as already pointed out above, a partial condensation may be performed, whereby the allyl chloride is separated from the monochloroparaffin, which is then reconducted into the reaction zone.

Whether the olefin, hydrogen chloride and oxygen or monochloroparaffin and oxygen starting materials can be used in stoichiometric amounts depends on the explosion limits for the oxygen-containing gas mixtures in the reaction zone, prior to entering it, and after leaving it. In general, oxygen is used in an amount below the stoichiometric amount. The molar proportion of monochloroparaffin to oxygen is advantageously between 5 and 1, more advantageously between 4 and 2. However, a ratio above 5 and below 1 may also be used. When an olefin, hydrogen chloride and oxygen are used as starting components, the molar amounts of the olefin and hydrogen chloride suitably do not differ, and are for example in the range of from 1:5 and 5:1, while the oxygen can be used in deficiency or in excess. In general, the reaction is not quantitative. After separation of the reaction products, the starting components are reconducted into the reactor.

The temperatures and pressures to be maintained are not critical. In order to obtain high conversions it is advantageous to work at high temperatures and high pressure. However, too high a temperature favors the formation of undesired oxidation products, while too high a pressure favors the formation of addition products of hydrogen chloride on the olefin, for example 2-chloropropane and 1-chloropropane with the use of propylene. It is, therefore, suitable to operate at a temperature in the range of from 20 to 350° C. and preferably 100 to 300° C. and under a pressure in the range of from 0.2 to 20 atmospheres, preferably 1 to 10 atmospheres. However, the reaction takes place outside of the aforesaid ranges.

The process according to the invention differs from known processes for the preparation of allyl chloride and its methyl-substitution products in that the olefin is reacted with hydrogen chloride and oxygen instead of with chlorine. Since the monochloroparaffins, especially the preferred isopropyl chloride and tert. butylchloride, are produced industrially from olefins and hydrogen chloride, in the variant of the process reacting monochloroparaffins to obtain allyl chloride and its methyl-substitution products, the chlorine is likewise replaced by hydrogen chloride and oxygen.

The following examples serve to illustrate the invention but they are not intended to limit it thereto.

Example 1

150 cc. of bentonite (aluminum silicate) in the form of balls having a diameter of 5 mm. were impregnated with a hydrochloric acid solution of 8 grams of tellurium dioxide. The tetravalent tellurium compound was reduced by a treatment with sulfur dioxide for 12 hours at 20° C. The catalyst was then washed with water and filled into a tube having a diameter of 18 mm. At 200° C. and atmospheric pressure a gas mixture was passed through consisting per hour of 25 N liters of propylene, 10 N liters of oxygen and 10 N liters of hydrogen chloride (N meaning under normal conditions, i. e. 0° C. and 760 mm. of mercury). The issuing gas mixture contained 5% by volume of allyl chloride, 3% by volume of 2-chloropropane and 0.02% by volume of 1-chloro-propane.

When the temperature was raised to 250° C., the reaction mixture contained 5% by volume of allyl chloride, 1% by volume of 2-chloro-propane and 0.1% by volume of 1-chloro-propane. After a time of operation of several hours the catalyst contained tellerium compounds in addition to elementary tellurium.

Example 2

150 cc. of bentonite were impregnated as described in Example 1 with a solution of 8 grams of tellurium dioxide in 2 N hydrochloric acid.

The catalyst, which had not been reduced, was treated in a tube having a diameter of 18 mm. and heated at 200° C. at atmospheric pressure with a mixture consisting per hour of 20 N liters of propylene, 5 N liters of oxygen and 10 N liters of hydrochloric acid. The issuing gas mixture was cooled to +20° C., whereby water was condensed. The residual gas was further cooled to −20° C. 10.5 grams of condensate were obtained per hour consisting of 7 grams of allyl chloride, 2.5 grams of 2-chloro-propane, 0.5 gram of 1-chloro-propane, 0.1 grams of 1,2-dichloropropane and 0.4 gram of water.

After having been on operation for 8 hours the catalyst contained elementary tellurium in addition to compounds of tetravalent tellurium.

Example 3

150 cc. of catalyst was used which had been prepared as described in Example 1. A mixture consisting per hour of 25 N liters of isobutylene, 10 N liters of oxygen and 10 N liters of hydrogen chloride was passed over the catalyst at 200° C. and atmospheric pressure. The issuing gas mixture was condensed. A mixture of 3 grams of methallyl chloride, 0.5 gram of 1,3-dichloro-2-methylene-propane, 12 grams of tert. butyl chloride and 0.1 gram of isobutyl chloride was obtained per hour.

Example 4

A solution of 10 grams of tellurium dioxide in 200 milliliters of concentrated hydrochloric acid was poured over 200 cc. of granular active carbon and the mixture was evaporated to dryness. The catalyst thus obtained was contacted per hour, at atmospheric pressure and 170° C., with 30 N liters of propylene, 15 N liters of hydrogen chloride, and 8 N liters of oxygen. The gas mixture leaving the reaction space was cooled, whereby 8 grams of organic liquid were obtained per hour consisting of 48% by weight of allyl chloride
36% by weight of 2-chloro-propane
12% by weight of 1,2-dichloropropane
2% by weight of trans-1-chloro-propene-1
2% by weight of cis-1-chloro-propene-1
1% by weight of 1-chloro-propane
<1% by weight of 2-chloro-propane.

Example 5

250 cc. of bentonite in the form of balls having a diameter of 5 mm. were impregnated with a solution of 12.5 grams of tellurium oxide in concentrated hydrochloric acid and the mixture was evaporated to dryness. The catalyst obtained was filled in a tube having an internal diameter of 26 mm. and provided with external heating. An evaporator, heated at 100° C. and connected in series with the reaction tube, was charged per hour with 10 N liters of oxygen and 80 grams of liquid isopropyl chloride. The gas mixture was passed through the reaction tube at atmospheric pressure and at a temperature of 195° C. The issuing gas mixture was cooled, whereby a condensate was obtained which contained, after drying, unreacted isopropyl chloride and per hour about 7 grams of allyl chloride, less than 0.1 gram of 1,2-dichloro-propane and less than 0.01 gram of 1-chloropropylene-1.

After having been in operation for 1 hour the catalyst contained elementary tellurium besides a small quantity of bound tellurium.

Example 6

200 cc. of kieselguhr in the form of cylinders having a diameter of 3 mm. and a length of 5 mm. were evaporated to dryness in a rotary evaporator together with a solution of 8 grams of tellurium dioxide in hydrochloric acid. The impregnated carrier was treated with sulfur dioxide at 20° C., whereby the tetravalent tellurium was reduced to the metal state.

The catalyst obtained was filled into a tube provided with external heating and having a diameter of 20 mm. Per hour a mixture of 6 N liters of oxygen and 50 grams of previously evaporated tert. butyl chloride was passed through the tube at 180° C., and atmospheric pressure. At the end of the reaction zone the issuing mixture was cooled. The condensate contained 4.5 grams of methallyl chloride, 0.1 gram of 1,3-dichloro-2-methylene-propane and 0.1 gram of 1,2-dichloro-2-methyl-propane.

We claim:
1. A process for preparing allyl chloride or its monomethyl substitution products, respectively, which comprises reacting oxygen and (a) a mixture of hydrogen chloride and an olefin having three or four carbon atoms respectively; (b) a monochloro paraffin having three or four carbon atoms respectively; and (c) a mixture of (a) and (b), at a temperature of from 20° C. to 350° C. and at a pressure of from 0.2 to 20 atmospheres in the presence of at least one catalyst selected from the group consisting of tellurium, tellurium oxides, tellurium chlorides, and tellurium oxychlorides.

2. A process as in claim 1 wherein said catalyst is supported on a carrier.

3. A process as in claim 1 wherein said catalyst contains 0.5 to 20 percent by weight of tellurium.

4. A process as in claim 1 wherein the reaction temperature is from 100° C. to 300° C.

5. A process as in claim 1 wherein the reaction pressure is from 1 to 10 atmospheres.

6. A process as in claim 1 wherein propylene, hydrogen chloride, and oxygen are reacted.

7. A process as in claim 1 wherein isopropyl chloride and oxygen are reacted.

8. A process as in claim 1 wherein isobutylene, hydrogen chloride, and oxygen are reacted.

9. A process as in claim 1 wherein tert.-butyl chloride and oxygen are reacted.

References Cited

FOREIGN PATENTS

| 671,130 | 9/1963 | Canada. |
| 1,365,892 | 5/1964 | France. |

LEON ZITVER, *Primary Examiner.*

J. BOSKA, *Assistant Examiner.*